(12) United States Patent
Furukoshi et al.

(10) Patent No.: US 6,215,223 B1
(45) Date of Patent: Apr. 10, 2001

(54) DRIVING CIRCUIT OF A MOTOR

(75) Inventors: Hiroyuki Furukoshi, Toyohashi; Yoshihiro Adachi, Hamakita; Shinichi Naito, Toyohashi; Satoshi Morizaki, Hoi-gun, all of (JP)

(73) Assignee: ASMO Co., Ltd. (JP)

( * ) Notice: Subject to any disclaimer, the term of this patent is extended or adjusted under 35 U.S.C. 154(b) by 0 days.

(21) Appl. No.: 09/217,833

(22) Filed: Dec. 22, 1998

(30) Foreign Application Priority Data

Dec. 26, 1997 (JP) .................................................... 9-358912

(51) Int. Cl.$^7$ ..................................................... H02N 2/00
(52) U.S. Cl. ................. 310/316.01; 310/316.02; 310/317
(58) Field of Search .................... 310/316.01, 316.02, 310/317

(56) References Cited

U.S. PATENT DOCUMENTS 4,630,245 * 12/1986 Dam ...................................... 310/340
4,713,571 * 12/1987 Suzuki et al. ..................... 310/316.01
4,926,084 * 5/1990 Furutsu et al. .................. 310/316.01
5,616,979 * 4/1997 Nishikawa ........................... 310/310

FOREIGN PATENT DOCUMENTS 9-98583    4/1997 (JP) ................................. H02N/2/00

* cited by examiner

Primary Examiner—Thomas M. Dougherty
(74) Attorney, Agent, or Firm—Parkhurst & Wendel, L.L.P.

(57) ABSTRACT

When a motor is driven by a signal transmitted due to a switch turned on, a count value is added. When the motor is stopped, the count value is subtracted. When the count value is an upper limit value, the motor is continuously driven until the switch is changed to an off state. Subsequently, until the count value comes to a lower limit value, the motor is maintained in a stopped state even if the switch of the motor is changed to an on state. For this reason, generation of heat in the motor can be prevented.

4 Claims, 7 Drawing Sheets

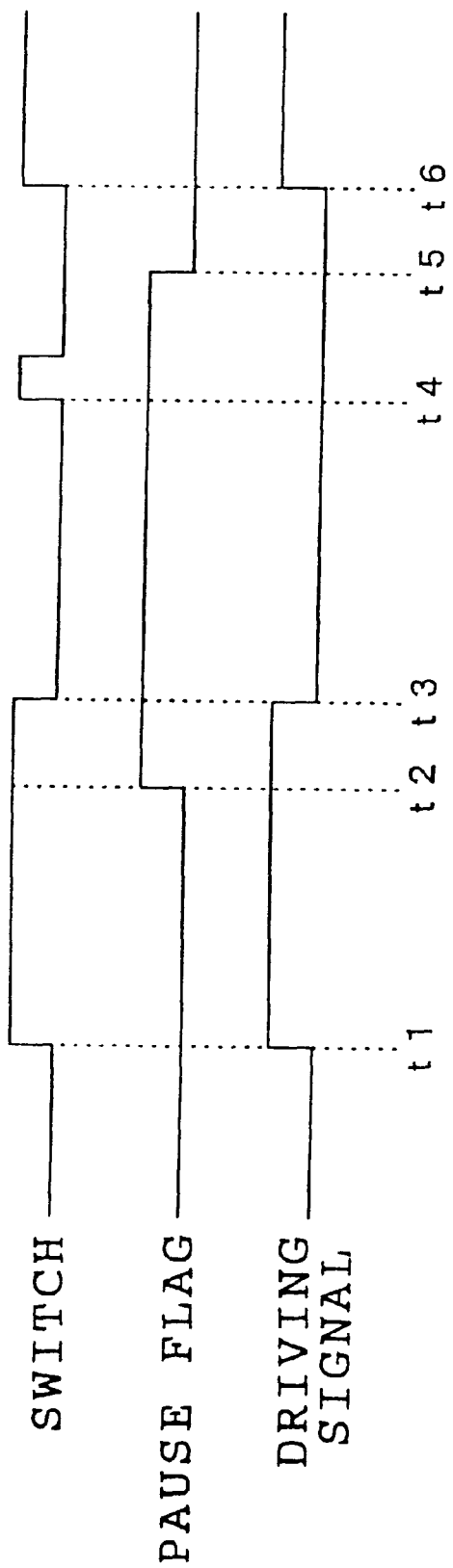

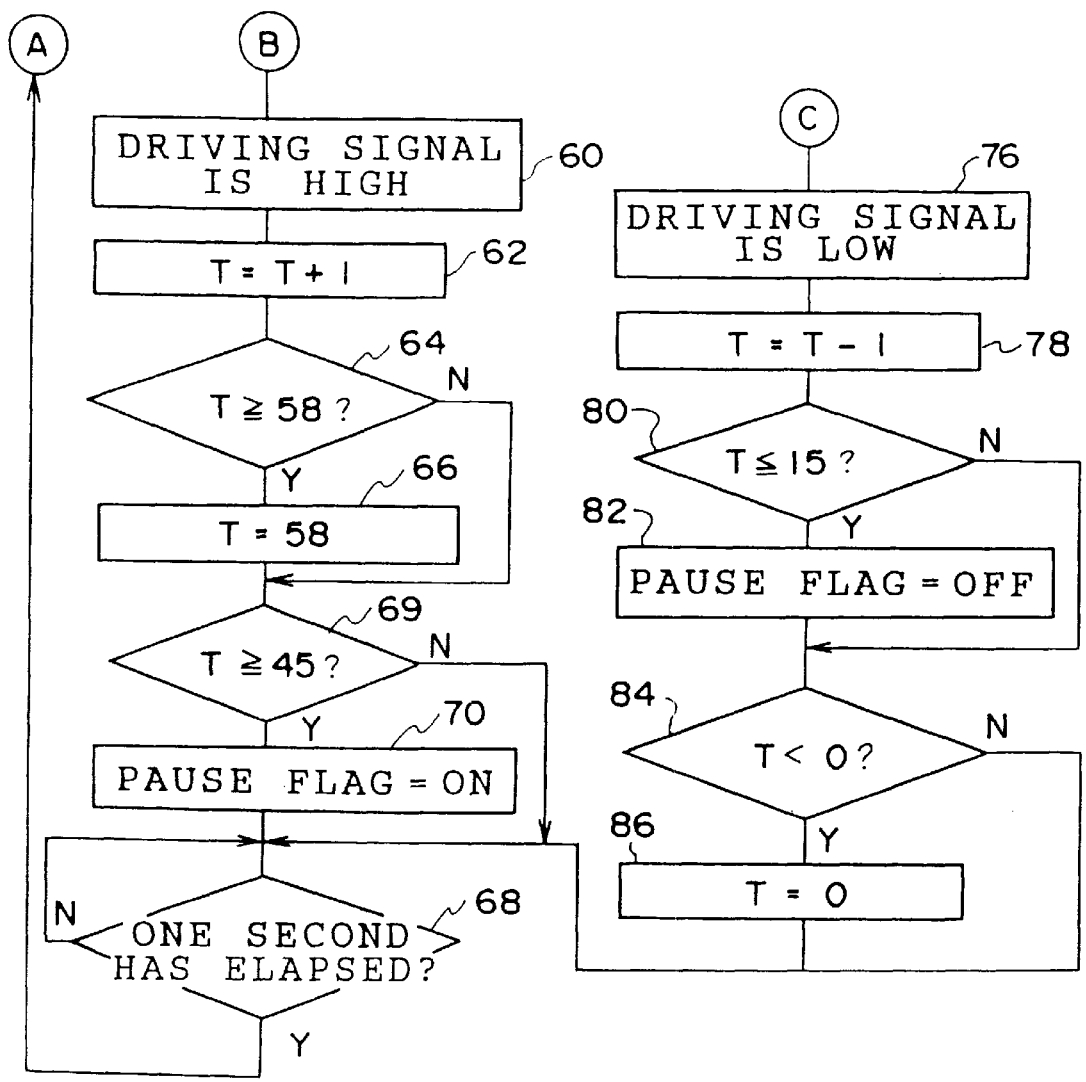

DRIVING CIRCUIT OF A MOTOR

BACKGROUND OF THE INVENTION

1. Field of the Invention

The present invention relates to a driving circuit of a motor, which is used to drive a motor, particularly, an ultrasonic motor.

2. Description of the Related Art

There has conventionally been known an ultrasonic motor which employs ultrasonic vibration as driving force. In a traveling-wave ultrasonic motor which is a kind of ultrasonic motor, a stator is formed with a piezoelectric body attached to a ring-shaped elastic body and a rotor mounted on a driving shaft press-contacts the stator. The driving circuit of the ultrasonic motor supplies, to the piezoelectric body, driving signals of two phases (sine wave and cosine wave) which differ from each other by 90 degrees at a predetermined frequency. Due to mechanical vibration of the piezoelectric body caused by the driving signals of the two phases, the elastic body is excited by ultrasonic vibration (traveling wave) in which the antinode and node of the vibration move annularly along the elastic body. The traveling wave causes the rotor, which press-contacts the elastic body, and the driving shaft to rotate.

As described above, the ultrasonic motor produces driving force by frictional force generated by the piezoelectric body and the elastic body, and therefore, when the ultrasonic motor is driven continuously for a long time, there have existed problems in that the piezoelectric body may crack, degradation of performance caused by heat may occur, and elements which form the driving circuit (for example, MOS-FET and the like) may be broken.

In order to solve the above-described problems, generally, there is applied a method in which, with a temperature detecting element such as a thermistor used, when the temperature rises, the driving of an ultrasonic motor is stopped.

However, in the above-described method, there is a possibility that, even if a switch is turned on by an operator, the ultrasonic motor suddenly stops irrespective of whether the ultrasonic motor is broken or not, which makes the operator believe that something is wrong.

SUMMARY OF THE INVENTION

In view of the above-described circumstances, it is an object of the present invention to provide a driving circuit of a motor, which can prevent failure of parts, which is caused by driving of the motor for a long time, or degradation of performance of the motor caused by heat without making the operator believe that something is wrong.

A circuit for driving a predetermined device by a motor in a first aspect of the present invention comprises: switching means for switching the motor on and off; counting means which adds a count value with the motor being driven due to being switched on by said switching means and which subtracts the count value with the motor being stopped due to being switched off by said switching means; determination means which determines whether the count value counted by said counting means becomes an upper limit value or greater; stopping means which stops driving of the motor when the count value becomes the upper limit value or greater; and delaying means which, when the count value is the upper limit value or greater and said switching means is in an on state, delays execution of said stopping means until said switching means is changed from on to off.

According to the first aspect of the present invention, when the motor is driven, a count value counted by the counting means is added. When the motor is stopped, the count value is subtracted. When the count value has reached the upper limit value, the driving of the motor must be inevitably stopped. However, until the switch is changed from an on state to an off state, the predetermined device is moved to a predetermined position without stopping the motor by the delaying means. For this reason, there is no possibility of the motor being suddenly stopped, and thereby making the operator feel that something is wrong.

A circuit for driving a predetermined device by a motor in a second aspect of the present invention comprises: switching means for switching the motor on and off; counting means which adds a count value with the motor being driven due to being switched on by said switching means and which subtracts the count value with the motor being stopped due to being switched off by said switching means; determination means which determines whether the count value counted by said counting means becomes an upper limit value or greater or becomes a lower limit value or less; and stopping means which stops driving of the motor until the count value comes to the lower limit value, when the count value is the upper limit value or greater and when said switching means is changed from on to off.

According to the second aspect of the present invention, after the predetermined device has been moved to a predetermined position and the switching means has been changed from an on state to an off state, until the count value comes to the lower limit value or less, driving of the motor is stopped by the stopping means even when the switching means is turned on again. As a result, driving of the motor for a long time is prevented.

A circuit for driving a predetermined device by a motor in a third aspect of the present invention comprises: switching means for switching the motor on and off; counting means which adds a count value with the motor being driven due to being switched on by said switching means and which subtracts the count value with the motor being stopped due to being switched off by said switching means; determination means which determines whether the count value counted by said counting means becomes a first upper limit value or greater, or becomes a second upper limit value, which is greater than the first upper limit value, or greater, or becomes a lower limit value or less; and stopping means which stops the driving of the motor until the count value comes to the lower limit value, when the count value is the first upper limit value or greater and said switching means is changed from on to off and when the count value is the second upper limit.

According to the third aspect of the present invention, even if the switching means remains on without being changed to an off state, when the count value comes to the second upper limit value, driving of the motor is stopped. For this reason, there is no possibility of the motor being continuously driven with the switching means on.

A circuit for driving a predetermined device by a motor in a fourth aspect of the present invention is characterized by further comprising stop maintaining means which, when the driving of the motor is stopped by said stopping means, maintains a stopped state of the motor, even if said switching means is turned on, until the count value becomes a lower limit value after the stopping of the motor.

According to the fourth aspect of the present invention, after the count value has reached the upper limit value and the switching means has changed from an on state to an off state to stop the motor, until the count value comes to the lower limit value, the motor is maintained in a stopped state with the switching means on. For this reason, when the motor is driven for a long time, a stopping time is compulsorily set, thereby preventing a failure of the motor caused by heat, degradation of performance of the motor, and the like.

BRIEF DESCRIPTION OF THE DRAWINGS

FIG. 5 is a timing chart for illustrating the operation of a microcomputer.

FIGS. 6A and 6B are a flow chart which shows the operation of a control program of the microcomputer.

DESCRIPTION OF THE PREFERRED EMBODIMENTS

Referring now to the attached drawings, an embodiment according to the present invention will be hereinafter described in detail.

Figure 2:
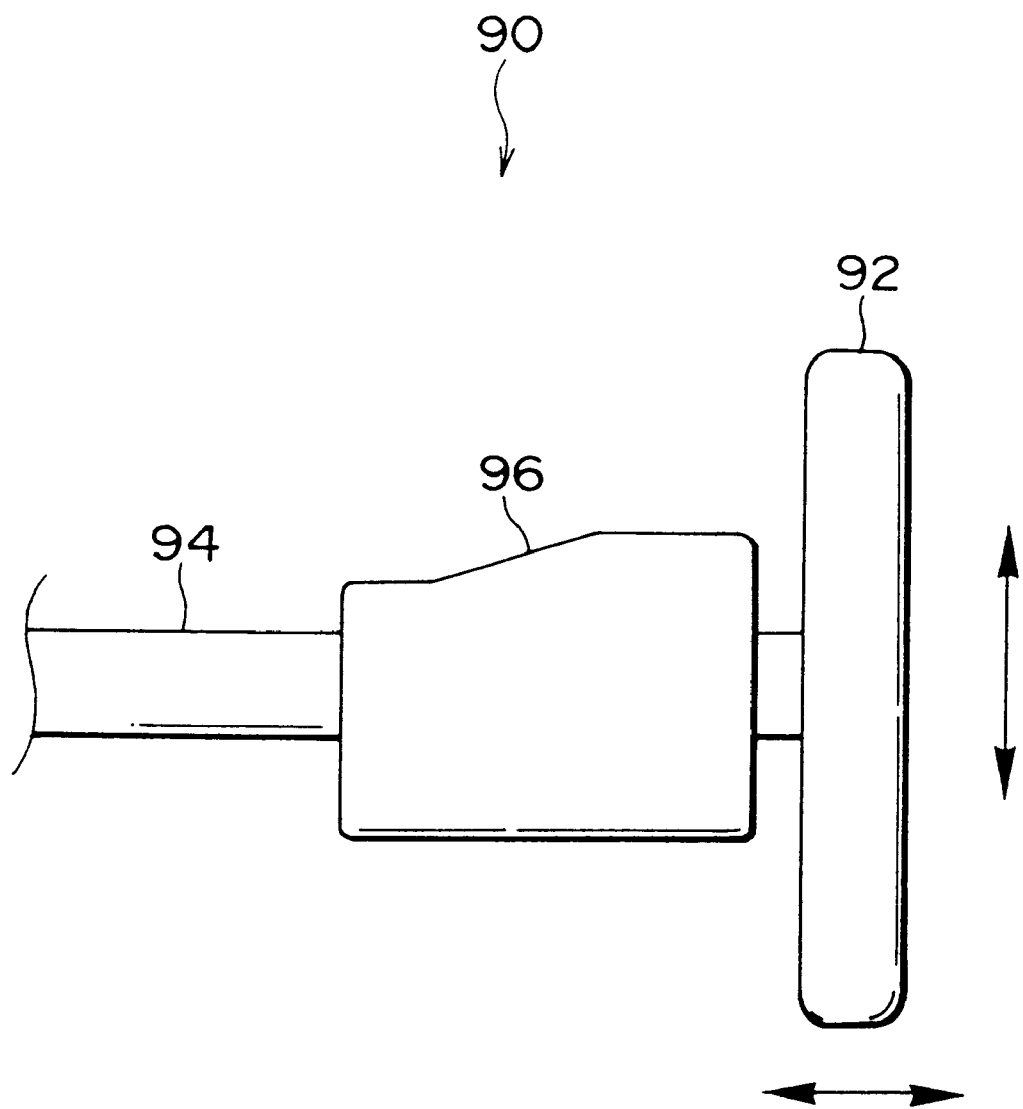
FIG. 2 is a schematic structural diagram of a principal portion of a steering device.

FIG. 2 schematically shows a principal portion of a steering device 90 of an automobile. The steering device 90 includes a steering gear box (not shown) for steering wheels (not shown) and one end of a steering shaft 94 is connected to the steering gear box.

The other end of the steering shaft 94 is connected to a steering wheel 92. Further, a portion of the steering shaft 94 is covered by a steering column 96. Provided within the steering column 96 are a so-called tilt mechanism (not shown) for moving the steering wheel 92 in the vertical direction and a so-called telescopic mechanism (not shown) for moving the steering wheel 92 in the axial direction of the steering shaft 94.

Figure 3:
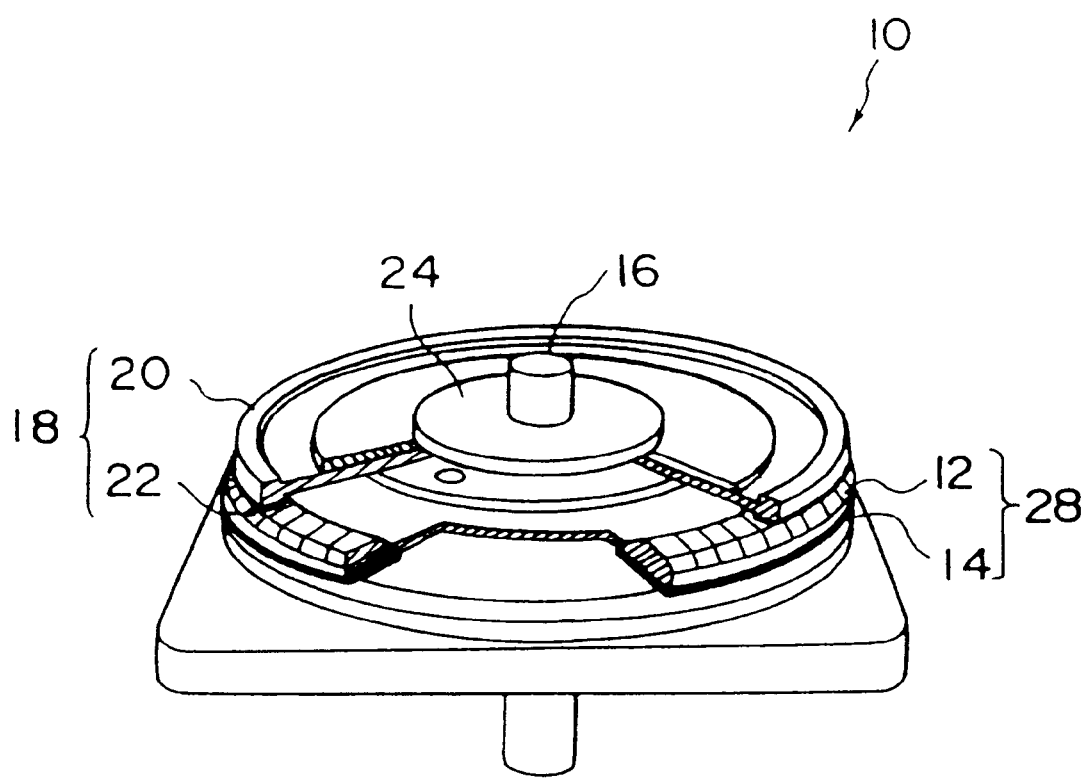
FIG. 3 is a partially sectional perspective view which shows a schematic structure of the ultrasonic motor.

In the above-described tilt mechanism or telescopic mechanism, when a traveling-wave ultrasonic motor 10 as shown in FIG. 3 is used, the driving force of the ultrasonic motor 10 allows movement of the steering wheel 92 in the vertical direction or in the axial direction of the steering shaft 94.

The schematic structure of the above-described ultrasonic motor 10 is shown in FIG. 3. The ultrasonic motor 10 includes a ring-shaped elastic body 12 made from copper alloy or the like. A stator 28 is formed with a piezoelectric body 14 attached to the elastic body 12.

The piezoelectric body 14 is formed from piezoelectric materials which convert an electric signal to a mechanical signal and the materials are arranged to form a ring-shaped configuration in such a manner as to be divided by a large number of electrodes. A rotor 18 mounted on a driving shaft 16 is formed with a ring-shaped slider 22 adhering to a rotor ring 20 made from aluminum alloy or the like. The slider 22 is press-contacted against the elastic body 12 by a spring 24. As the slider 22, for example, engineering plastics are used to obtain a stable frictional force and coefficient of friction. As a result, the rotor 18 can be driven at high efficiency.

Figure 1:
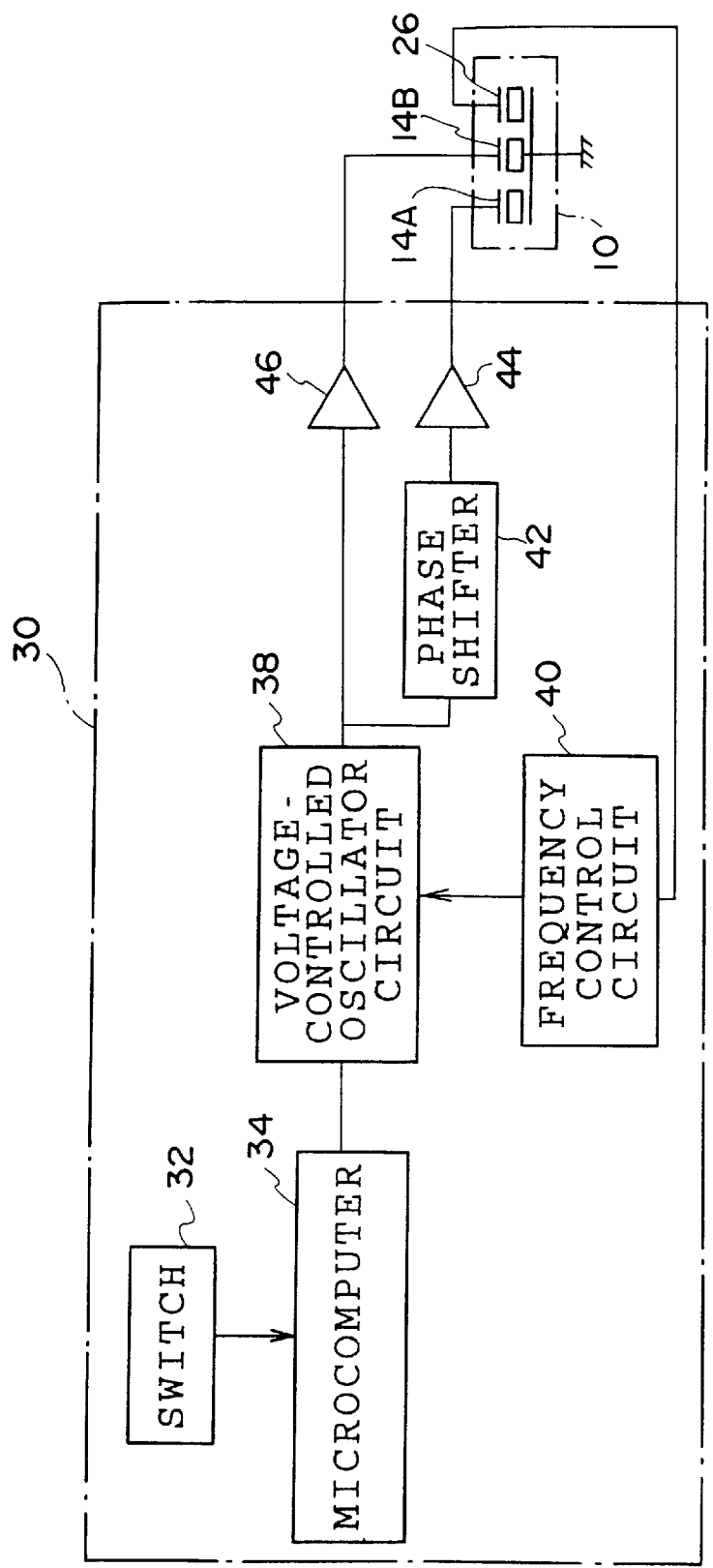
FIG. 1 is a schematic structural diagram of an ultrasonic motor driving circuit.

Further, a piezoelectric element 26 (see FIG. 1) is attached to the elastic body 12. As shown in FIG. 1, one end of the piezoelectric element 26 is grounded and the other end thereof is connected to an input end of a frequency control circuit 40 of an ultrasonic motor driving circuit 30.

The piezoelectric element 26 detects vibration of the elastic body 12 and outputs an alternating current signal (a feed-back signal) of which amplitude and cycle each correspond to the vibration. An output end of the frequency control circuit 40 is connected to a signal input end of a voltage-controlled oscillator circuit 38. The voltage-controlled oscillator circuit 38 outputs a signal having a frequency corresponding to a voltage level of a signal inputted to the signal input end and having a fixed amplitude.

The signal output end of the voltage-controlled oscillator circuit 38 is branched into two portions. One branched portion is connected to the input end of an amplifying circuit 46 and the other branched portion is connected to the input end of an amplifying circuit 44 via a phase shifter 42. The phase shifter 42 outputs by varying the phase of the inputted signal by 90 degrees. Accordingly, signals of the same frequency and amplitude, whose phases differ from each other by 90 degrees, are inputted to the amplifying circuits 44 and 46, respectively.

The amplifying circuits 44 and 46 are each formed to include an inductance element or a transformer and each amplifying circuit amplifies an inputted signal at a fixed amplification factor (i.e., step-up) and outputs the signal as an ultrasonic motor driving signal. An output end of the amplifying circuit 44 is connected to one end of a piezoelectric body 14A and an output end of the amplifying circuit 46 is connected to one end of a piezoelectric body 14B. The other ends of the piezoelectric bodies 14A and 14B are each grounded. The piezoelectric bodies 14A and 14B form the piezoelectric body 14 of the ultrasonic motor 10.

A signal output end of a microcomputer 34 is connected to a signal input end of the voltage-controlled oscillator circuit 38 and a driving signal for driving the ultrasonic motor 10 is inputted to the voltage-controlled oscillator circuit 38. When the driving signal is set in a high-level state, the voltage-controlled oscillator circuit 38 oscillates to drive the ultrasonic motor 10. When the driving signal is set in a low-level state, the voltage-controlled oscillator circuit 38 stops oscillating to thereby stop the ultrasonic motor 10.

Further, a signal output end of a switch 32 for giving an instruction for starting or stopping driving of the ultrasonic motor 10 is connected to a signal input end of the microcomputer 34. The microcomputer 34 contains a ROM, in which a control program for controlling a driving signal to be inputted to the voltage-controlled oscillator circuit 38 is stored.

Next, an operation in the embodiment of the present invention will be described in detail with reference to the attached drawings.

FIG. 1 schematically shows an ultrasonic motor driving circuit according to the present invention. When the power source of the driving circuit 30 is turned on, the control program stored in the ROM of the microcomputer 34 is activated.

When the switch 32 is turned on and the instruction for the start of driving is given, the microcomputer 34 sets the driving signal at a high level by the control of a control program, which will be described later. When the driving signal is set at the high level, the voltage-controlled oscillator circuit 38 starts oscillating. In this case, the frequency control circuit 40 outputs a frequency control signal of a relatively low voltage level, and the voltage-controlled oscillator circuit 38 outputs a signal whose frequency is sufficiently higher than a driving frequency band of the ultrasonic motor 10 correspondingly to the voltage level of the frequency control signal.

The signal outputted from the voltage-controlled oscillator circuit 38 is branched into two portions and the branched one portion has the phase which is varied by the phase shifter 42 by 90 degrees. These branched portions are respectively amplified by the amplifying circuits 44 and 46 so as to allow the generation of a sine-wave driving signal and a cosine-wave driving signal, and these driving signals are supplied to the piezoelectric bodies 14A and 14B of the ultrasonic motor 10.

The driving signals are converted to mechanical vibration by the piezoelectric bodies 14A and 14B, and the stator 28 is excited by a traveling wave to allow rotation of the driving shaft 16 and the rotor 18. Further, the vibration of the elastic body 12 is converted by the piezoelectric element 26 to an electric signal (a feed-back signal) and is further inputted to the frequency control circuit 40 of the driving circuit 30.

The frequency control circuit 40 controls, based on the feed-back signal inputted from the piezoelectric element 26, the voltage level of the frequency control signal so that the frequency of the driving signal to be supplied to the ultrasonic motor 10 comes to an optimum driving frequency of the ultrasonic motor 10.

The ultrasonic motor 10 is driven in such a manner as described above, but, when the switch 32 is set in an on state for a long time to continuously drive the ultrasonic motor 10, there is a possibility that the piezoelectric body 14 may crack due to friction caused between the piezoelectric body 14 and the elastic body 12, or degradation of performance caused by heat may occur, or elements which form the driving circuit 30 may be broken.

Accordingly, during operation of the ultrasonic motor 10 (when the driving signal is set at a high level), a count value (a pause determination value) counted by the microcomputer 34 for each fixed time is added. During stopping of the ultrasonic motor 10 (when the driving signal is set at a low level), the count value is subtracted. When the pause determination value becomes a predetermined upper-limit pause determination value (in this embodiment, for example, 45) or greater, the ultrasonic motor 10 is continuously driven until the switch 32 is turned off or until a pause determination value T becomes an allowable upper limit value (in this embodiment, for example, 58), and a predetermined device is thereby moved to a predetermined position.

After the predetermined device has been moved to the predetermined position and the switch 32 has been turned off, until the pause determination value comes to a predetermined lower-limit pause determination value (in this embodiment, for example, 15) or less, the ultrasonic motor 10 is maintained in a stopped state without being driven even if the switch 32 is turned on again. As a result, driving of the ultrasonic motor 10 for a long time is prevented.

Figure 6A:
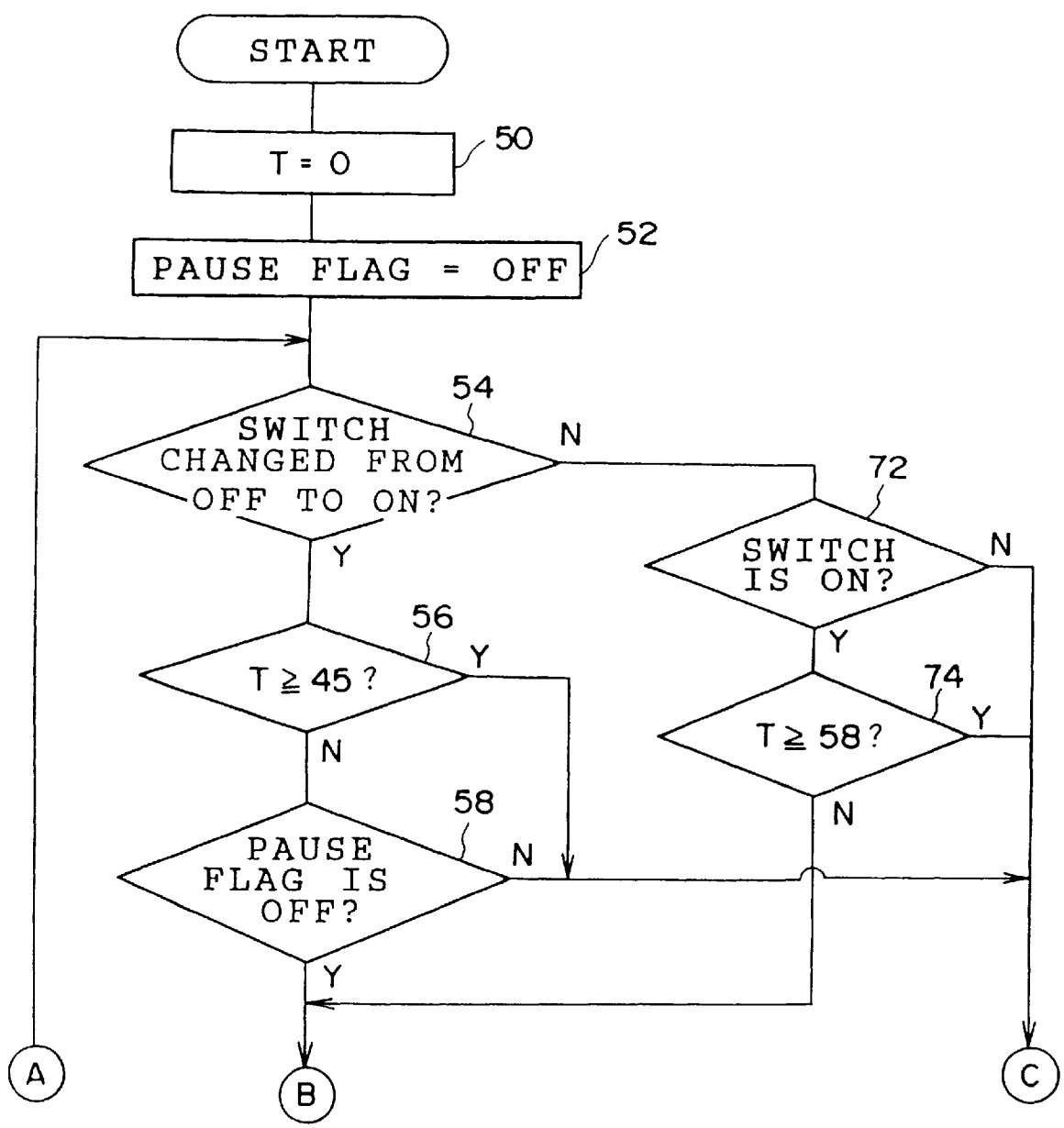

A control program of the microcomputer 34 which executes the above-described control will be described with reference to the flow chart shown in FIGS. 6A and 6B.

First, when the control program stored in the ROM of the microcomputer 34 is activated, in step 50, the pause determination value T is initialized at 0. In the subsequent step 52, a pause flag is initialized in an off state. In step 54, it is determined whether the switch 32 has been changed from an off state to an on state. When the decision of step 54 is no, the process proceeds to step 72, and when the decision of step 54 is yes, the process proceeds to step 56.

In step 56, it is determined whether the pause determination value T is 45 (the upper limit pause determination value) or greater, and when the decision of step 56 is yes, the process proceeds to step 76. When the decision of step 56 is no, the process proceeds to step 58, in which it is determined whether the pause flag is off. When the decision of step 58 is no, the process proceeds to step 76. When the decision of step 58 is yes, in step 60, the driving signal is set at a high level and the ultrasonic motor 10 is driven.

Subsequently, in step 62, one is added to the pause determination value T and the process proceeds to step 64. In step 64, it is determined whether the pause determination value T is 58 (an upper limit value which can be set as the pause determination value) or greater. When the decision of step 64 is no, the process proceeds to step 69. When the decision of step 64 is yes, in step 66, the pause determination value T is set at 58 and the process proceeds to step 69.

In step 69, it is determined whether the pause determination value T is set at 45 (the upper limit pause determination value) or greater, and when the decision of step 69 is no, the process proceeds to step 68. When the decision of step 69 is yes, in step 70, the pause flag is set in an on state and the process proceeds to step 68.

Further, in step 72, it is determined whether the switch 32 remains on, and when the decision of step 72 is no, the process proceeds to step 76. When the decision of step 72 is yes, in step 74, it is determined whether the pause determination value T is 58 (an upper limit value which can be set as the pause determination value) or greater. When the decision of step 74 is no, the process proceeds to step 60. When the decision of step 74 is yes, the process proceeds to step 76.

In step 76, the driving signal is set at a low level and driving of the ultrasonic motor 10 is stopped. In the subsequent step 78, the pause determination value T is subtracted by one and the process proceeds to step 80. In step 80, it is determined whether the pause determination value T is 15 (the lower limit pause determination value) or less, and when the decision of step 80 is no, the process proceeds to step 84. When the decision of step 80 is yes, in step 82, the pause flag is set in an off state and the process proceeds to step 84. In step 84, it is determined whether the pause determination value T is 0 (a lower limit value which can be set as the pause determination value) or less, and when the decision of step 84 is no, the process proceeds to step 68. When the decision of step 84 is yes, in step 86, the pause determination value T is set at 0 and the process proceeds to step 68.

In step 68, it is determined whether one second has elapsed. When the decision of step 68 is no, a loop is executed until one second has elapsed. When one second has elapsed, the process returns to step 54. For this reason, the control program allows one loop in one second.

Figure 4:
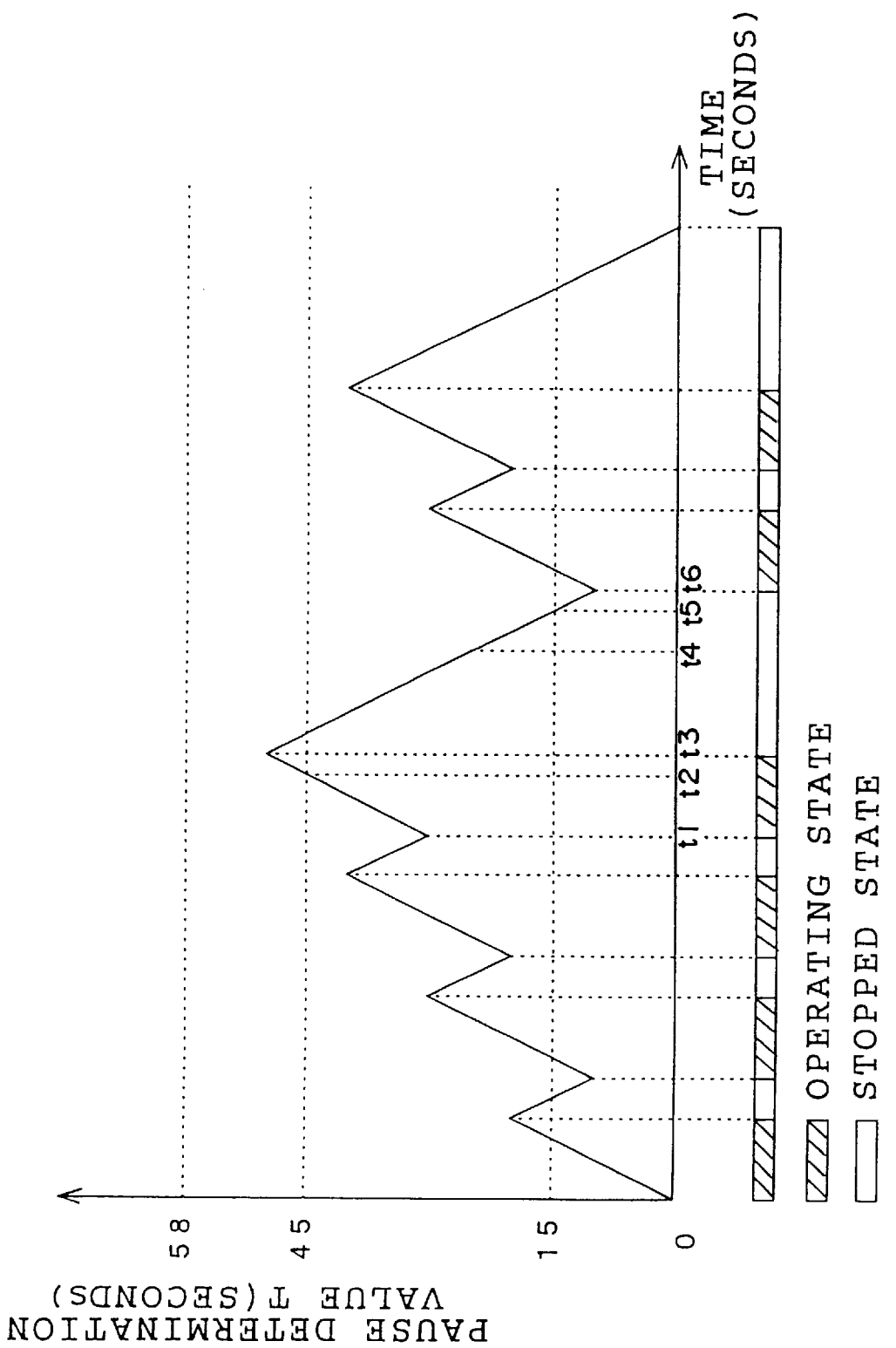
FIG. 4 is a diagram which shows the relationship between a pause determination value and time.

The above-described operation will be specifically described with reference to FIGS. 4 and 5. FIG. 4 shows the relationship between the pause determination value T and time, and FIG. 5 shows a timing chart which represents each operation of the switch 32, the pause flag, and the driving signal.

As shown in FIG. 4, oblique-line regions each indicate the time the ultrasonic motor 10 is driven, and blank regions each indicate the time the ultrasonic motor 10 is stopped. First, when the power source of the driving circuit 30 is turned on, the pause determination value T is initialized at 0. When the switch 32 is turned on, the microcomputer 34 sets the driving signal at a high level to drive the ultrasonic motor 10, and the pause determination value T is added.

When the switch 32 is turned off, the microcomputer 34 sets the driving signal at a low level to stop driving the ultrasonic motor 10, and the pause determination value T is subtracted.

As described above, when an on/off operation of the switch 32 is repeated to allow repetition of driving/stopping of the ultrasonic motor 10 and the switch 32 is again turned on from t1, the driving signal also comes to the high level to allow driving of the ultrasonic motor 10, and the pause determination value T is added. Subsequently, the pause determination value T exceeds 45 (the upper limit pause determination value) at t2 and the pause flag is set to be on. However, the switch 32 remains on, and therefore, the driving signal is maintained at a high level and the ultrasonic motor 10 is continuously driven.

When the switch 32 is turned off at t3, the driving signal is set at a low level and the ultrasonic motor 10 is stopped. Then, the pause flag is set in an on state even if the switch 32 has been turned on at t4, and therefore, the microcomputer 34 maintains the ultrasonic motor 10 in a stopped state with the driving signal maintained at a low level, and the pause determination value T is subtracted.

When the pause determination value T is set at 15 (lower limit pause determination value) or less at t5, the pause flag is set in an off state. Subsequently, when the switch 32 is turned on again at t6, the pause flag is in an off state, and therefore, the drive signal is set at a high level. Further, the ultrasonic motor 10 is driven again and the pause determination value T is added.

As described above, even if the switch 32 is turned on to continuously drive the ultrasonic motor 10 and the pause determination value T becomes 45 (upper limit pause determination value) or greater, the driving signal is maintained at the high level and driving of the ultrasonic motor 10 is not immediately stopped. Further, it is possible that the ultrasonic motor 10 be continuously driven until the switch 32 is turned off and the predetermined device be moved a predetermined position. Meanwhile, even if the switch 32 remains on without being turned off, when the pause determination value T becomes 58 (an upper limit value which can be set as the pause determination value T), the driving signal is forcedly set at the low level and driving of the ultrasonic motor 10 is stopped. For this reason, there is no possibility that the ultrasonic motor 10 be continuously driven even with the switch 32 on.

Further, after the predetermined device has been moved to the predetermined position, the ultrasonic motor 10 is forcedly maintained in a stopped state until the pause flag is set in an off state even with the switch on. For this reason, failure caused by friction of the piezoelectric body 14 and the elastic body 12, degradation of performance caused by abnormal heating, failure of elements which form the driving circuit 30, and the like can be prevented.

In the present embodiment, the value which can be set as the pause determination value T ranges from 0 to 58 and the upper limit pause determination value and the lower limit pause determination value are respectively set at 45 and 15. The present invention is not limited to the same, and appropriate values may also be set as occasion demands. Further, an additional value and a subtracted value of the pause determination value T to be processed in the control program are both not limited to one, and these values can be freely selected. Moreover, a loop cycle of the control program is not limited to one second and it may be varied as occasion demands.

In addition, in the present embodiment, the microcomputer 34 is used to execute the control by software, but the present invention is not limited to the same. The microcomputer 34 may be replaced by hardware such as a counter circuit, a comparison circuit, a delay circuit, and the like, so as to execute the control.

What is claimed is:

1. A driving circuit for a motor, comprising:
    a switch which may be turned on and off;
    a counter which counts up during a time when the motor is being driven, and counts down during a time when the motor is stopped;
    determination means for determining whether a count value counted by said counter is equal to or greater than an upper limit value and for determining whether the count value is equal to or less than a lower limit value, the lower limit value being less than the upper limit value; and
    a controller which when the switch is turned off in a state in which the count value is equal to or greater than the upper limit value, stops the motor, and which, when the motor is stopped in a state in which the count value is equal to or greater than the upper limit, maintains a stopped state of the motor until the count value is equal to or less than the lower limit value even if the switch is turned on.

2. A driving circuit for a motor according to claim 1, wherein the motor is an ultrasonic wave motor.

3. A driving circuit for a motor, comprising:
    a switch which may turned on and off;
    a counter which counts up during a time when the motor is being driven, and counts down during a time when the motor is stopped;
    determination means for determining whether a count value counted by said counter is equal to or greater than an uppermost limit value and for determining whether the count value is equal to or greater than an upper limit value, the upper limit value being less than the uppermost limit value, and for determining whether the count value is equal to or less than a lower limit value, the lower limit value being less than the upper limit value; and
    a controller which when the switch is turned off in a state in which the count value is equal to or greater than the upper limit value and when the count value is equal to or greater than the uppermost limit value, stops the motor, and when the motor is stopped in a state in which the count value is equal to or greater than the upper limit value, maintains a stopped state of the motor until the count value is less than the lower limit value even if the switch is turned on.

4. A driving circuit for a motor according to claim 3, wherein the motor is an ultrasonic wave motor.

* * * * *